United States Patent
Barcelo et al.

(10) Patent No.: US 6,819,094 B2
(45) Date of Patent: *Nov. 16, 2004

(54) CONSTANT-CURRENT/CONSTANT-VOLTAGE CIRCUIT ARCHITECTURE

(75) Inventors: Trevor W. Barcelo, Acton, MA (US); Robert L. Reay, Mountain View, CA (US); David M. Dwelley, Santa Barbara, CA (US)

(73) Assignee: Linear Technology Corporation, Milpitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/716,129

(22) Filed: Nov. 17, 2003

(65) Prior Publication Data

US 2004/0100243 A1 May 27, 2004

Related U.S. Application Data

(63) Continuation of application No. 10/443,299, filed on May 21, 2003, now Pat. No. 6,700,364, which is a continuation of application No. 10/106,499, filed on Mar. 27, 2002, now Pat. No. 6,570,372, which is a continuation of application No. 09/837,658, filed on Apr. 18, 2001, now Pat. No. 6,522,118.

(51) Int. Cl.[7] .................................................. G05F 3/16
(52) U.S. Cl. ...................................................... 323/316
(58) Field of Search ................................ 323/269, 274, 323/315, 316, 317

(56) References Cited

U.S. PATENT DOCUMENTS

| | | | | |
|---|---|---|---|---|
| 4,853,609 A | * | 8/1989 | Numata et al. | 323/312 |
| 5,266,887 A | * | 11/1993 | Smith | 323/316 |
| 5,519,309 A | * | 5/1996 | Smith | 323/316 |
| 5,519,310 A | * | 5/1996 | Bartlett | 323/316 |
| 5,936,393 A | * | 8/1999 | Nauta | 323/316 |
| 5,973,490 A | * | 10/1999 | Nauta | 323/316 |
| 6,194,967 B1 | * | 2/2001 | Johnson et al. | 330/288 |
| 6,343,024 B1 | * | 1/2002 | Zabroda | 363/22 |
| 6,522,118 B1 | * | 2/2003 | Barcelo et al. | 323/316 |
| 6,570,372 B2 | * | 5/2003 | Barcelo et al. | 323/316 |
| 6,587,000 B2 | * | 7/2003 | Oikawa | 330/288 |
| 6,700,364 B2 | * | 3/2004 | Barcelo et al. | 323/316 |

OTHER PUBLICATIONS

"SC801 Fully Integrated High Current Lithium–Ion Battery Charger System," *Semtech Corp.*, pp. 1–10, Apr. 26, 2001.
"MAX1811 USB–Powered Li+ Charger," *Maxim Integrated Products*, pp. 1–8, Apr. 1, 2001.
"AD3810/ADP3811 Secondary Side, Off–Line Battery Charger Controllers," *Analog Devices*, pp. 1–16, Oct. 1996.
"Li–ion/Li Polymer Battery Charger ISL6292 Data Sheet," *Intersil*, pp. 1–20, Jul. 2003.
"Li–ion/Li Polymer Battery Charger ISL6292 New Product Profile," Intersil, pp. 1–3, 2002.

* cited by examiner

*Primary Examiner*—Jeffrey Sterrett
(74) *Attorney, Agent, or Firm*—Fish & Neave LLP; Joel Weiss; Andrew Van Court

(57) ABSTRACT

Methods and circuits implementing a constant-current/constant-voltage circuit architecture are provided. The methods and circuits preferably provide a charging system that provides current to a load using a fixed current until the load is charged. When the load is charged, the methods and circuits preferably provide a variable current to the load in order to maintain the voltage level across the load. This variable current varies according to the voltage across the load. In one embodiment of the invention, a constant power current may also be used as one of the load charging currents. The constant power current may act as a limit on the charging circuit's power output.

6 Claims, 8 Drawing Sheets

CONSTANT-CURRENT/CONSTANT-VOLTAGE CIRCUIT ARCHITECTURE

CROSS-REFERENCE TO A RELATED PATENT APPLICATION

This application is a continuation of U.S. patent application Ser. No. 10/443,299, filed May 21, 2003, now U.S. Pat. No. 6,700,364, which is a continuation of U.S. patent application Ser. No. 10/106,499, filed Mar. 27, 2002 (issued as U.S. Pat. No. 6,570,372), which is a further continuation of U.S. patent application Ser. No. 09/837,658, filed Apr. 18, 2001 (issued as U.S. Pat. No. 6,522,118).

BACKGROUND OF THE INVENTION

This invention relates to circuitry and methods which may be used to provide a current to a load. More particularly this invention relates to circuitry that provides a constant current to a load until the voltage across the load reaches a certain value. When this value is reached, the current delivered to the load must be varied to maintain a constant load voltage.

This type of circuitry is referred to as a constant-current/constant-voltage system, and the charging circuitry of a lithium ion battery is a common use for such circuitry. Frequently, conventional systems use a programmable resistor to set the value of the constant charging current.

It would be desirable to provide circuitry that provides a constant current to a load until the voltage across the load reaches a pre-determined value and then maintains the voltage across the load at the predetermined value by varying the current to the load.

It would also be desirable to provide a signal proportional to the load current.

SUMMARY OF THE INVENTION

It is an object of the invention to provide circuitry that provides a constant current to a load until the voltage across the load reaches a pre-determined value and then maintains the voltage across the load at the predetermined value by varying the current to the load.

It is also an object of this invention to provide a signal proportional to the load current.

The circuit according to the invention includes a first current loop that is adapted to provide a fixed current, a second current loop that is adapted to provide a variable current, and a priority circuit.

The priority circuit receives a first signal from the first current loop and a second signal from a second current loop. The first signal indicates the level of an available fixed current. The second signal from the second current loop indicates the level of an available variable current. The priority circuit may compare the two signals and select one of the first current loop and the second current loop to provide current to the load based on a predetermined priority assigned to the first signal and the second signal—e.g., whichever current has lower magnitude.

A method of charging a load according to the invention includes selecting a load charging current from one of a fixed current and a variable current, the variable current being based on the voltage across the load, the selecting being based on a predetermined priority.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
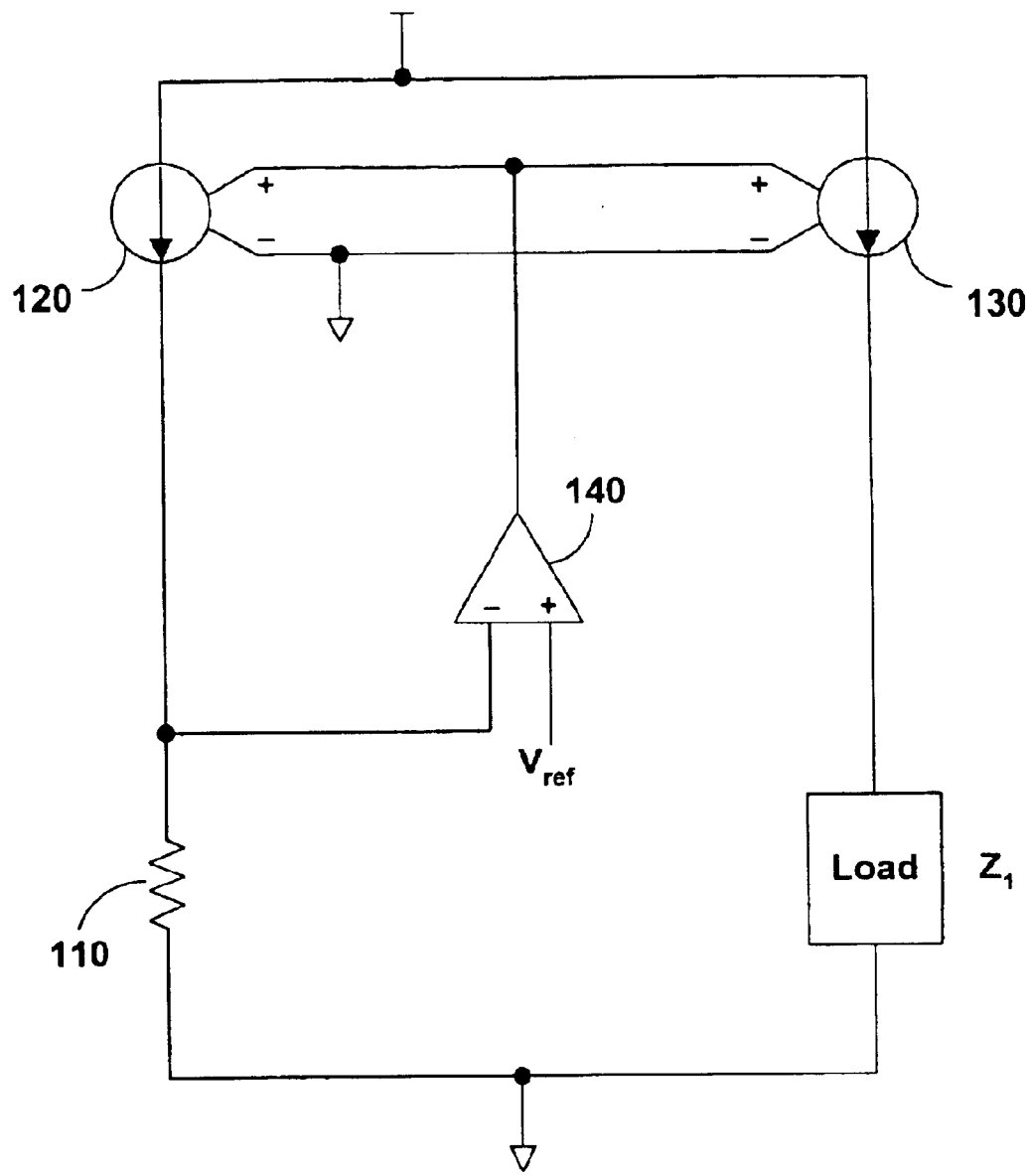
FIG. 1 is a prior art constant-current charging circuit.

Circuitry and methods according to the invention provide a system that transitions from constant-current mode—i.e., charging the load at a constant current—to constant-voltage mode—i.e., continuing to provide current to the load while maintaining the voltage across the load at a particular value.

A circuit according to the invention preferably provides two possible charging loops for charging a load. The first loop provides a fixed current in order to charge the load. The second loop provides a variable current to charge the load. The variable current varies according to the voltage across the load. The variable current is used to maintain the voltage across the load at a predetermined value.

The circuit according to the invention receives signals from each of the first loop and the second loop. The first loop provides a signal that indicates the fixed current that it is adapted to provide to the load. The value of the fixed current may be determined by the value of a fixed or predetermined reference voltage divided by the resistive value of a resistor. The second loop provides a signal that indicates the level of the variable current that the second loop is adapted to provide to the load based on circuit conditions—e.g., the voltage across the load at a given moment.

The loops are preferably not adapted to provide current simultaneously. Rather, each of the loops may preferably provide current independently of the other loop—i.e., when the other loop is not providing current.

A circuit according to the invention also includes a priority circuit. This circuit is configured to receive signals from each of the respective loops. These signals preferably indicate the level of current that the particular loop is adapted to provide under present circuit conditions. Thus, the priority circuit is cognizant of the available fixed current and the available variable current—i.e., that current that the second loop provides at the given circuit condition—across the entire operational range of the circuit.

Then, the priority circuit preferably compares the level of available fixed current to the level of the available variable current. Using the results of the comparison, the priority circuit preferably selects the smaller of the fixed and the variable current and uses that smaller current to charge the load.

The circuit operates as follows: First, the fixed current, which preferably remains substantially constant across the operational range of the circuit, is configured to be less than the maximum available variable current. At turn-ON of the circuit during, for example, the charging of an uncharged battery, the priority circuit compares the fixed current to the variable current. Because the battery is not charged, the variable current request signal is for maximum current. By design, this maximum current is greater than the fixed current request and the priority circuit selects the fixed current to charge the battery and begins charging the battery with the fixed current. Thereafter, the voltage across the battery increases.

When the battery approaches a state of being fully charged, the variable current request signal indicates a decrease in the variable current that the second loop is adapted to provide. When the variable current request signal indicates that the requested or available variable current is less than the fixed current, the priority circuit begins using the variable current to charge the battery. At this point in the charging cycle, the circuit is maintaining the voltage across the battery at a particular level. Thus, a constant-current/constant voltage system, as defined previously, has been established.

FIG. 1 shows an example of prior art constant-current mode charging schemes that use a programming resistor 110 to set the charging current. Voltage-controlled current sources 120 and 130 are wired in a master-slave configuration with the slave 130 supplying the output current to the load. The master current source 120 is varied such that $V_{ref}$ appears across resistor 110. This causes a current equal to $V_{ref}$/resistor 110 to flow in source 120 and, thus, the current equal to $V_{ref}$/resistor 110 to flow in source 130, and, thereafter, to be delivered to the load. Resistor 110 is commonly referred to as the programming resistor. Amplifier 140 provides the feedback from the voltage across resistor 110 in order to set the current through source 120.

Figure 2:
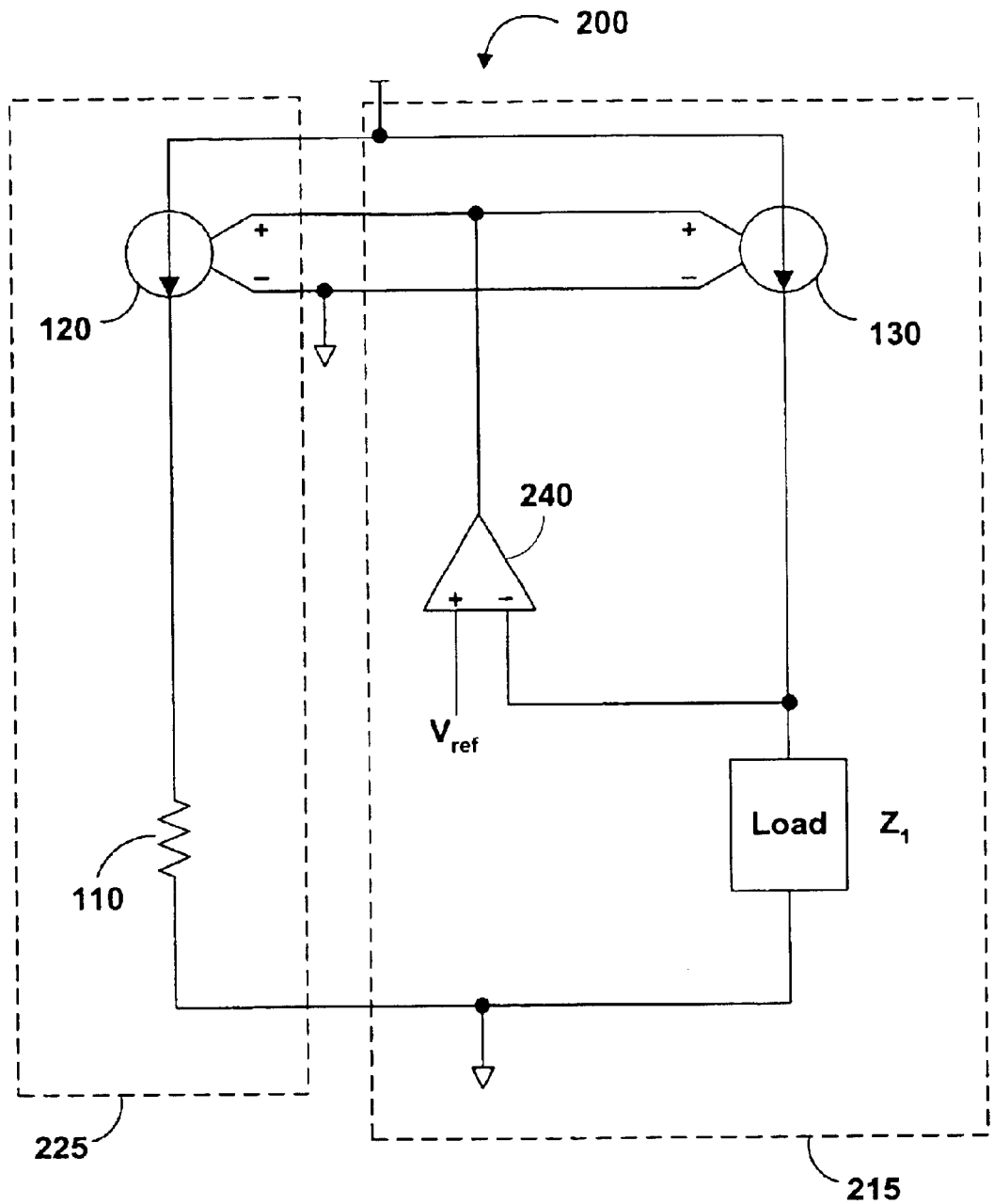
FIG. 2 is an exemplary constant-voltage charging circuit that provides continuous continuous information relating to the magnitude of the charging current according to the invention.

FIG. 2 shows an example of a constant-voltage mode charging circuit in dotted line 215. Amplifier 240 servos the drive voltage to the current sources 120 and 130 such that a fixed voltage, $V_{ref}$, is developed across the load, $Z_1$. This circuit ensures that the current delivered to the load is varied in order to maintain a constant voltage across the load. The portion of the circuit within dotted line 225 is not part of the constant-voltage mode charging scheme. Rather, it is included to show the logical progression from conventional circuitry to an embodiment of a circuit according to the invention. Furthermore, in the embodiment shown in FIG. 2, portion 225 shows that because the current through source 120 is equal to the current through source 130, the voltage developed across resistor 110 is proportional to the current being delivered to the load, $Z_1$. Thus, FIG. 2 illustrates the possibility that two charging schemes—i.e., a constant voltage scheme 215 and a constant current scheme 225—can coexist.

Figure 3:
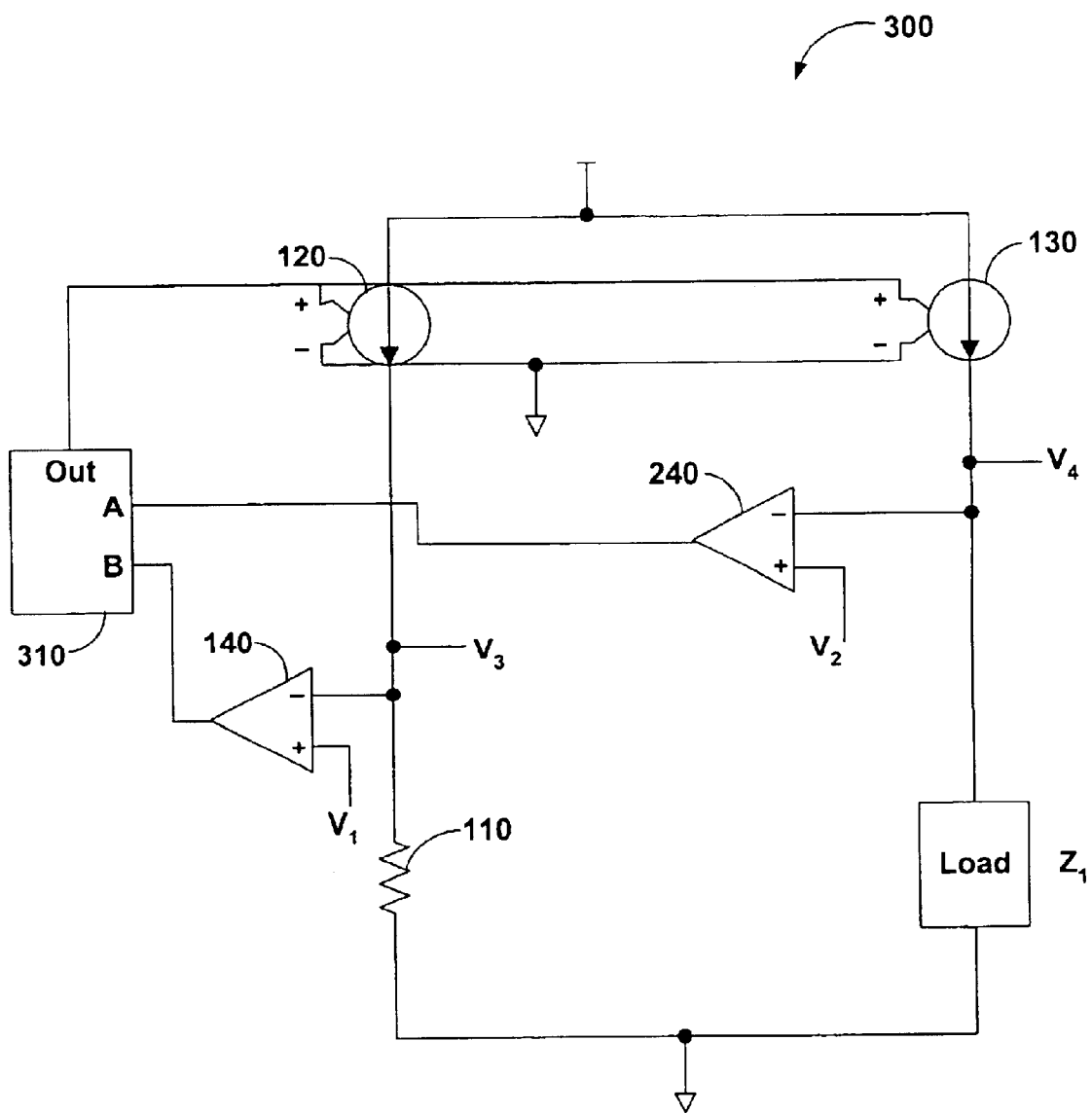
FIG. 3 is a schematic representation of one embodiment of a constant-current/constant-voltage charging circuit according to the invention.

FIG. 3 shows a schematic representation 300 of one embodiment of a circuit according to the present invention. Priority circuit 310 has two inputs, A and B, and an output, Out. Circuit 310 preferably connects the lower of the two inputs, A or B, to the output, Out. Therefore, the current flowing in 120, and thus 130, is equal to either the current required to develop $V_1$ across resistor 110 or the current required to develop $V_2$ across the load, $Z_1$, whichever current is lower in magnitude. Voltage node, $V_3$, also preferably continuously provides information regarding the magnitude of the charging current at all times. In an alternative embodiment of the invention, the higher magnitude current, or current identified by another identifying characteristic, may be selected to charge the load.

In the exemplary embodiment shown in FIG. 3, the operating conditions of circuit 300 are as follows. The load is a discharged battery, $V_1$/resistor 110 is equal to the desired charging current, and $V_2$ is equal to the desired final float potential of the battery. When charging begins, $V_4$, the voltage across the battery, is much lower than $V_2$, and the output of amplifier 240 slews to the positive supply rail because amplifier 240 is requesting maximum current.

Substantially simultaneously, amplifier 140 indicates the voltage that is necessary to develop $V_1$ across resistor 110. The voltage necessary to do this is lower than the positive supply rail (when the voltage controlled current source 120 is adapted to supply $V_1$/resistor 110 using a control voltage less than the positive supply). Then, the priority circuit connects the output of amplifier 140 to the control voltage of the current sources and ignores the output of amplifier 240. This request causes the current $V_1$/resistor 110 to be delivered to the load, $Z_1$. Circuit 300 then behaves exactly like the circuit in FIG. 1.

As the battery charges and $V_4$ approaches $V_2$, the output of amplifier 240 begins to drop. When the battery voltage, $V_4$, reaches $V_2$, the current required by the load to maintain this voltage begins to drop below $V_1$/resistor 110. Amplifier 140 tries to force $V_1$/resistor 110 into the battery, but this causes $V_4$ to rise above $V_2$ which causes the output of amplifier 240 to fall quickly. The drop in the output of amplifier 240 causes the priority circuit to choose the output of amplifier 240 as the controlling voltage for the current sources. At this point, the output of amplifier 140 is ignored and the loop behaves exactly like circuit 215 in FIG. 2. The current required by the load to maintain $V_4=V_2$ is less than $V_1$/resistor 110, so the voltage across resistor 110, labeled $V_3$, falls below $V_1$ and the output of amplifier 140 slews to the positive rail, and the priority circuit continues to select the constant voltage loop to provide current to the load. In summary, the current delivered to the load is preferably equal to $V_1$/resistor until the voltage across the load reaches about $V_2$. Then, the current delivered to the load is reduced in order to maintain $V_2$ across the load. This completes the constant-current/constant-voltage charging cycle.

Figure 4:
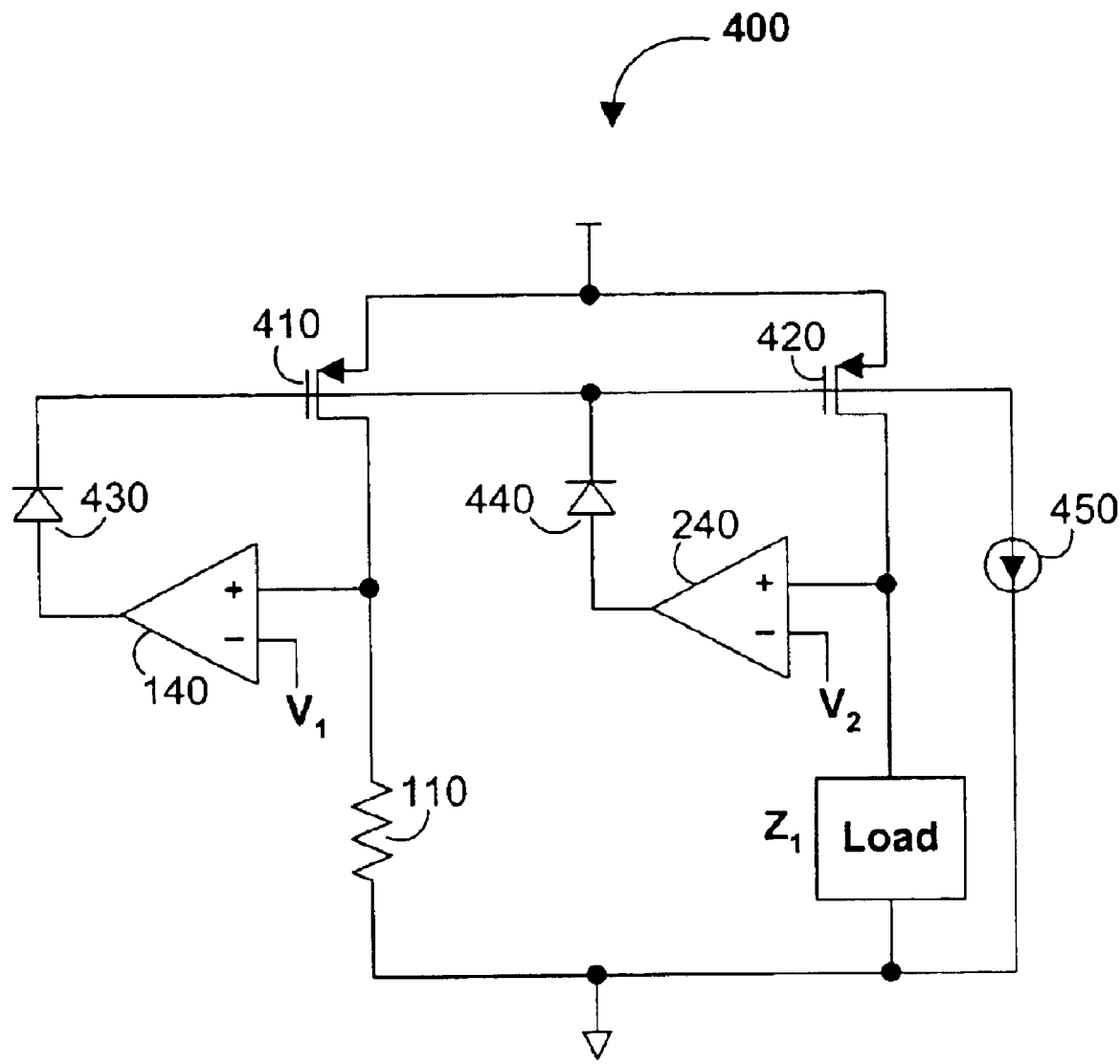
FIG. 4 is one implementation of a constant-current/constant-voltage charging circuit according to the invention.

A possible implementation of this invention is shown in FIG. 4. PMOS transistors 410 and 420 function as the voltage controlled current sources. Two diodes 430 and 440 and a pull-down current source 450 perform a diode—or function to implement the priority circuit.

Circuit 400 shown in FIG. 4 operates as follows. PMOS transistors 410 and 420 preferably have a polarity which is opposite the polarity of voltage-controlled current sources 120 and 130 shown in FIG. 3. In addition, it is well known in the art that increasing gate voltage of a PMOS transistor, while holding the source fixed, decreases the drain-source current of a PMOS transistor. It follows that, whereas voltage-controlled current sources 120 and 130 provided higher current in response to a higher voltage, PMOS transistors 410 and 420 provide lower current in response to higher voltage. Furthermore, amplifiers 140 and 240 are connected in opposite polarity from the amplifiers 140 and 240 shown in FIG. 3.

In the constant current phase of circuit 400, when the voltage across the load is less than $V_2$, amplifier 140 sets the current to the load at $V_1$/resistor 110. The output of amplifier 140 is preferably the voltage required to force the non-inverting input of amplifier 140 to have a voltage $V_1$. During this constant current phase of the circuit, the output of amplifier 240 is at the negative rail voltage. This negative rail voltage at the output of amplifier 240 is prevented from affecting the gate voltage of PMOS transistors 410 and 420 by diode 440. Therefore, the output of amplifier 140 controls the current to the load during this phase.

In the constant voltage phase of the circuit 400, when the voltage across the load is preferably at or above $V_2$, amplifier 240 sets the current to the load such that this current is preferably less than $V_1$/resistor 110. During this constant voltage phase of the circuit, the output of amplifier 140 is at the negative rail voltage. This negative rail voltage at the output of amplifier 140 is prevented from affecting the gate voltage of PMOS transistors 410 and 420 by diode 430. Therefore, the output of amplifier 240 controls the current to the load during this phase.

It has been shown that whichever output voltage from amplifiers 140 and 240 is higher controls the current to the load. Thus, one function of diodes 430 and 440 and PMOS transistors 410 and 420 is to select the higher output value of amplifiers 140 and 240 to provide the lower available or requested current to the load. Pull down current source 450 sets the base-line voltage of the gates of PMOS transistors 410 and 420 to zero so the higher output of the amplifiers can be used to accurately set the voltage of the gates.

Figure 5:
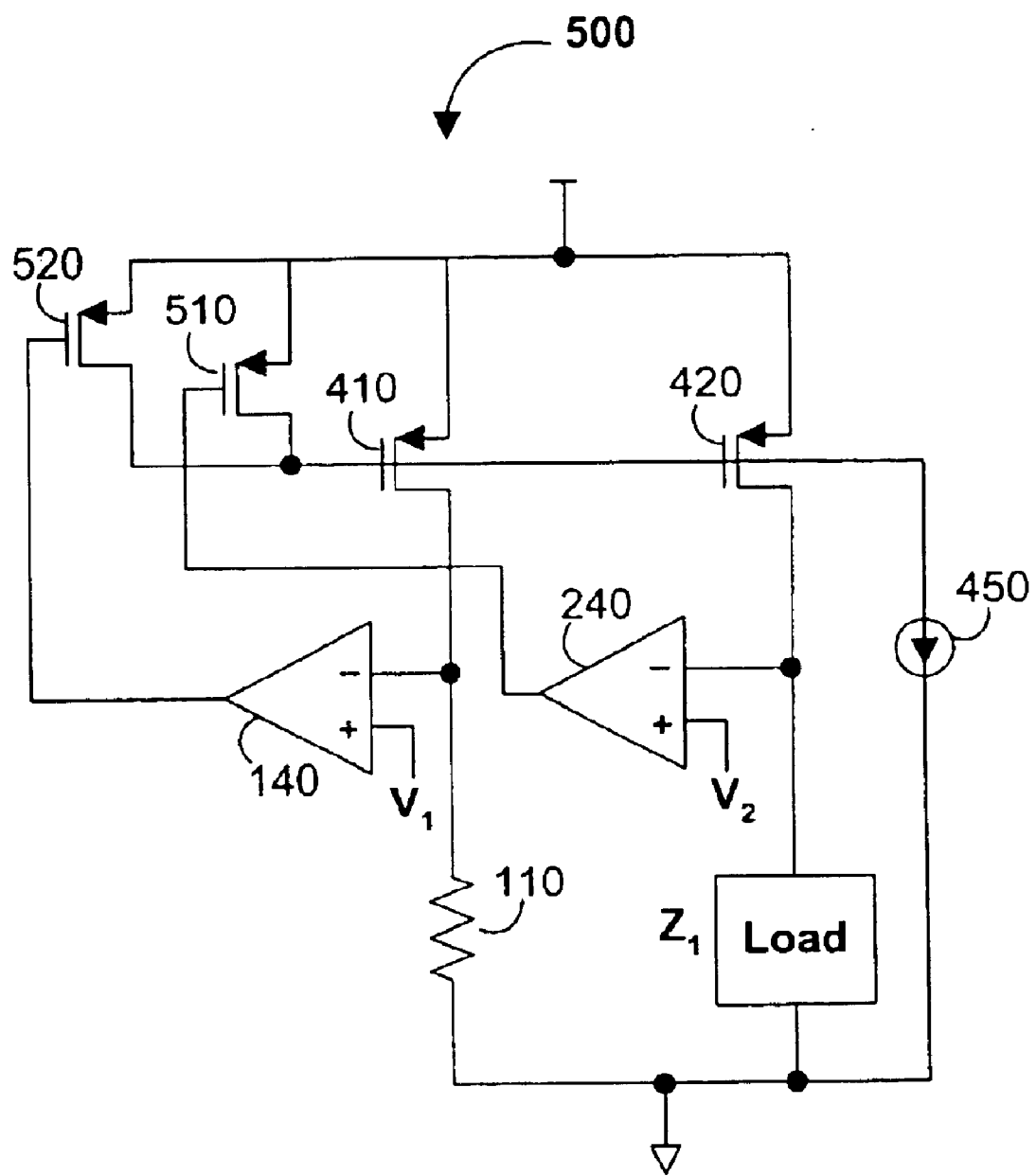
FIG. 5 is another implementation of a constant-current/constant-voltage charging circuit according to the invention.

FIG. 5 shows another possible implementation of the invention. In circuit 500, amplifiers 140 and 240 drive common-source PMOS stages 510 and 520. PMOS stages 510 and 520 share a pull-down current source 450 just as in circuit 400. In this configuration, however, the output of amplifiers 140 and 240 is being prioritized by PMOS stages 510 and 520 instead of by diodes 480 and 490 (shown in FIG. 4). PMOS stages 510 and 520 operate as follows to control the outputs of the amplifiers.

During the constant current charging phase, amplifier 240 (which has its inputs connected in a reverse polarity from FIG. 4) causes the output of amplifier 240 to slew to the positive voltage rail. This effectively shuts PMOS stage 510 OFF. Amplifier 140 (which also has its inputs connected in a reverse polarity from FIG. 4), on the other hand, provide a lower output than amplifier 240 because its inverting input is preferably lower than the positive supply rail. In this manner, the output of amplifier 140 causes PMOS stage 520 to provide the gate voltage signal at PMOS transistor 410 required to develop $V_1$ at the inverting input of amplifier 140. This gate voltage signal creates a fixed current through PMOS transistors 410 and 420.

When the voltage across the load is preferably greater than or equal to $V_2$, the output of amplifier 240 begins to drop. This is similar to the operation of circuits 300 and 400 shown in FIGS. 3 and 4. At this point, PMOS stage 510 is turned ON and its drain-source current begins to control the operation of PMOS transistors 410 and 420. This drain-source current is higher than the drain-source current of transistor 520 and, therefore, determines the gate voltage of transistors 410 and 420. When the drain-source current of transistor 510 drives the gate voltage of transistors 410 and 420 higher, this causes a lower drain-source current in transistors 410 and 420. At this point, a constant-voltage phase of circuit 500 is commenced and the drain-source current in transistors 410 and 420 is varied to maintain a constant voltage at the load.

Figure 6:
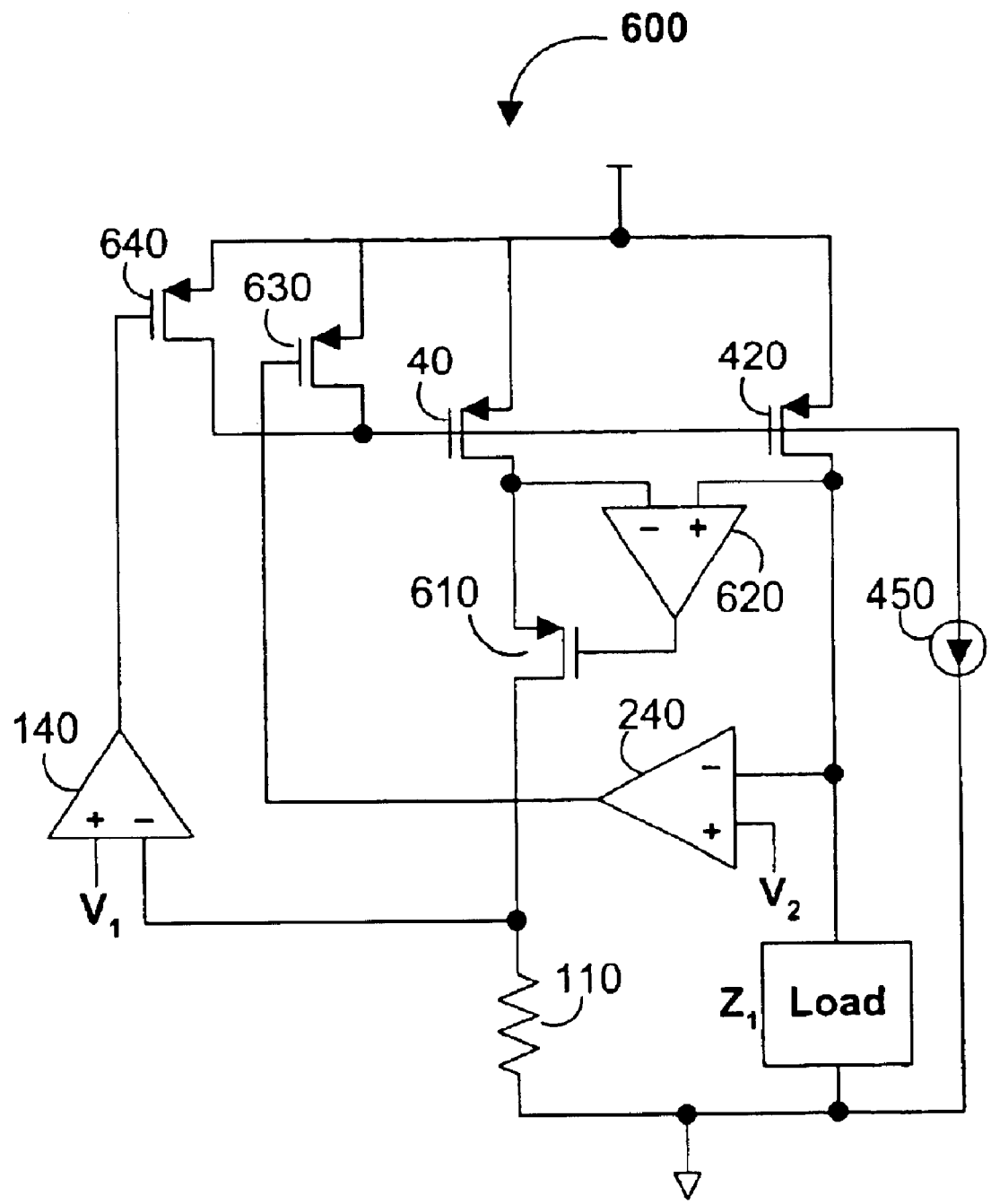
FIG. 6 is another implementation of a constant-current/constant-voltage charging circuit utilizing a current mirror according to the invention.

In order to improve the accuracy of the circuit architecture according to the invention when low output impedance current sources, such as transistors 410 and 420, are used, a third amplifier 620 can be inserted as shown in FIG. 6. In this circuit, amplifier 620 servos—i.e., feeds back a signal to—the gate of PMOS transistor 610 such that $V_{DS}$ of PMOS transistor 410 is equal to $V_{DS}$ of PMOS transistor 420. When these two voltages are equal, the drain-source current of PMOS transistor 420 more precisely mirrors the drain-source current of transistor 410. It follows that the current through resistor 110 will also more precisely reflect the drain-source current of transistor 410 in this configuration. In order for this circuit to function, $I_{load}$*resistor 110 should preferably be less than the voltage across the load because the only adjustment that can be implemented through transistor 610 is to increase the drain voltage, thereby reducing the drain-source current through transistor 610.

Figure 7:
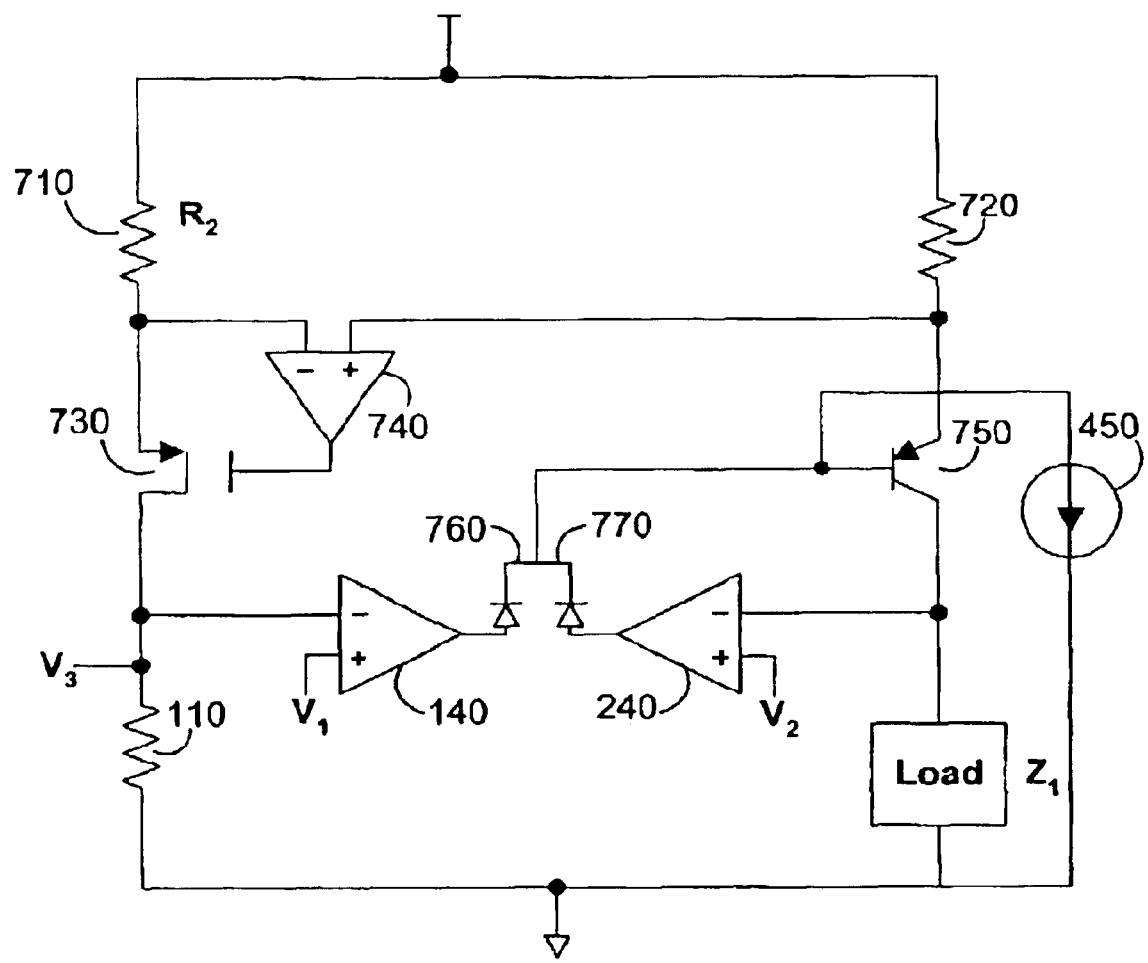
FIG. 7 is another implementation of a constant-current/constant-voltage charging circuit utilizing a current mirror according to the invention.

FIG. 7 shows another possible embodiment, circuit 700, of the circuit according to the invention. In circuit 700, amplifier 740 provides a current mirror function, together with BJT 750 and current source 450 (which is used to pull down the base of transistor 750), between current source resistors 710 and 720. Just as in FIG. 3, voltage, $V_3$, is preferably proportional to the load current during all phases of circuit operation. Diodes 760 and 770 are used to prioritize the outputs of amplifiers 140 and 240. Thus, amplifiers 140 and 240 operate to control the base current of BJT 750 and, thereby, the currents in current source resistors 710 and 720. In this way, operation of amplifiers 140 and 240 is similar to the operation of amplifiers 140 and 240 in FIGS. 3–6. Main differences between circuit 700 and the circuits shown in FIGS. 3–6 include the implementation of controllable current source resistors 710 and 720 and the use of the current mirror to set the currents through resistors 710 and 720 substantially equal to one another.

Figure 8:
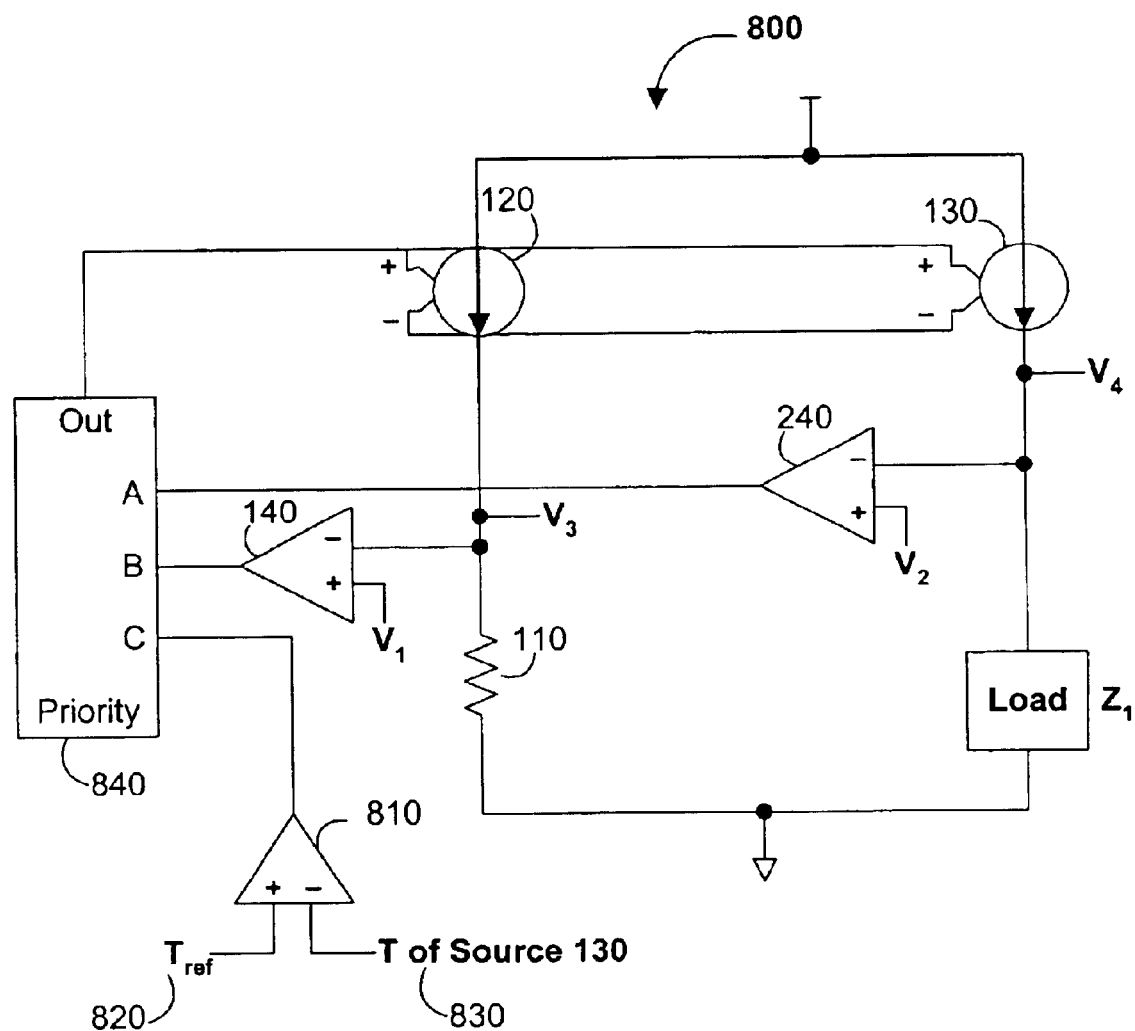
FIG. 8 is an embodiment of a constant-current/constant-voltage/constant-power charging circuit according to the invention.

The concept of this invention can be extended to include any number of input variables, not just constant-current and constant-voltage. For example, consider a case where the rate of power being dissipated in the current source driving the load must be limited. Circuit 800 in FIG. 8 includes an example of a priority circuit 840 that chooses between constant-current, constant-voltage, and constant-power charging of a load.

Operation of circuit 800 is exactly like that of FIG. 3, but now the output of amplifier 810 is added as an input, to the priority circuit 840. If, at any time, the power dissipated in current source 130 causes its temperature to exceed $T_{ref}$, then the output of amplifier 810 falls low enough so that the priority circuit 840 gives amplifier 810 control of the current sources. The operation of circuit 800 requires that the power dissipated in source 130 is proportional to the temperature of source 130. In this condition, amplifier 810 holds source 130 at a constant temperature, and thus, charges the load while maintaining constant power dissipation in source 130. It should be noted that the voltage across resistor 110 continues to be proportional to the charging current in this instance, just like in constant-current operation and constant voltage operation. Obvious extensions of FIGS. 4 and 5 can be used as possible implementations for the circuit shown in FIG. 8.

In conclusion, this invention disclosure presents a method of selecting one of several different feedback loops, used to control the charging of a load, according to a certain priority. A common example of a system benefitting from such an invention is the charging of a lithium-ion battery.

Thus, a constant-current/constant-voltage charging circuit is provided. One skilled in the art will appreciate that the present invention can be practiced by other than the described embodiments, which are presented for purposes of illustration and not of limitation, and the present invention is limited only by the claims which follow.

What is claimed is:

1. A method for providing a current to a load, comprising:

selecting a current provided to the load from one of a fixed current, a constant power current, and a variable current, the variable current being based on the voltage across the load, the selecting requiring selecting one of the fixed current, the variable current, and the constant power current based on a predetermined priority, the predetermined priority requiring selection of the current that provides the lower magnitude current or limits power dissipation of a current source providing current to the load.

2. The method of claim 1, wherein selection of the constant power current causes the current source to emit a predetermined temperature.

3. The method of claim 1, wherein the predetermined priority selects the constant power source if the power dissipation of the current source exceeds a predetermined level of power dissipation.

4. A circuit for providing current to a load, the circuit comprising:

a first current loop that is adapted to provide a fixed current;

a second current loop that is adapted to provide a variable current;

a third current loop that is adapted to provide a constant power current; and a priority circuit that receives a first signal from the first current loop which indicates the level of an available fixed current, a second signal from the second current loop which indicates the level of an available variable current, and a constant power signal from a constant power loop which indicates the level of power dissipation of a current source and selects one of the first current loop, the second current loop, and the constant power loop to provide current to the load based on a predetermined priority signal, the predetermined priority requiring selection of the current that provides the lower magnitude current or limits power dissipation of the current source.

5. The circuit of claim 4, wherein selection of the constant power current causes the current source to emit a predetermined temperature.

6. The method of claim 4, wherein the predetermined priority selects the constant power source if the power dissipation of the current source exceeds a predetermined level of power dissipation.

* * * * *

UNITED STATES PATENT AND TRADEMARK OFFICE
CERTIFICATE OF CORRECTION

PATENT NO. : 6,819,094 B2
DATED : November 16, 2004
INVENTOR(S) : Trevor W. Barcelo et al.

It is certified that error appears in the above-identified patent and that said Letters Patent is hereby corrected as shown below:

Title page,
Item [56], References Cited, OTHER PUBLICATIONS,
Change "AD3810" to -- DP3810 --.
"Li - ion/Li Polymer...." reference, insert -- December -- before "2002".

Column 2,
Line 6, delete the second occurrence of the word "continuous".

Signed and Sealed this

Nineteenth Day of July, 2005

JON W. DUDAS
*Director of the United States Patent and Trademark Office*